Jan. 1, 1952 C. H. YOUNG 2,580,875

TUBE CIRCUIT

Filed Sept. 25, 1945 2 SHEETS--SHEET 1

INVENTOR
C. H. YOUNG
BY: Walter M. Hill
ATTORNEY

INVENTOR
C.H.YOUNG
BY:
Walter M. Hill
ATTORNEY

Patented Jan. 1, 1952 2,580,875

UNITED STATES PATENT OFFICE 2,580,875

TUBE CIRCUIT

Clarence H. Young, Lincoln Park, N. J., assignor to Bell Telephone Laboratories, Incorporated, New York, N. Y., a corporation of New York Application September 25, 1945, Serial No. 618,549

2 Claims. (Cl. 250—27)

This invention relates to vacuum tube circuits and more particularly to a vacuum tube circuit in which the space current variation is stabilized against variations in cathode temperature.

In the operation of grid controlled rectifier circuits, particularly of the square law or parabolic rectifier type, and in the operation of direct current amplifier circuits, instability is often experienced due to variations in cathode temperature. This instability at times has been known to vary as much as two or more percent of the normal space current of the amplifier and in many applications this amount of instability is intolerable. This is especially true where these circuits are used in measuring equipment.

It is the object of this invention to overcome this instability by means of a simple auxiliary circuit utilizing the initial velocity potential of a separate space current path.

The foregoing object is achieved by this invention by providing in combination a first space current path including at least an anode, a grid and a heated cathode, the space current being variable as a function of the temperature of the cathode. An auxiliary or second space current path includes an anode and a heated cathode, the characteristics whereof vary with temperature in substantially the same manner as the characteristics of the cathode in the first path. A conductive means connects the second anode to the grid and another conductive path is formed between the cathode of the second space current path to the cathode of the first space current path, thereby enabling the initial velocity potential of the second space current path to vary the grid bias and automatically stabilize the space current in the first path for variations of cathode temperature.

Figure 1:
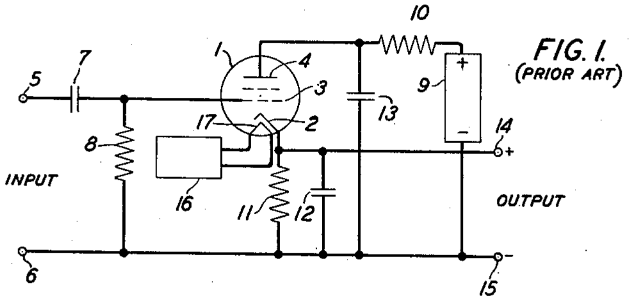
Figure 2:
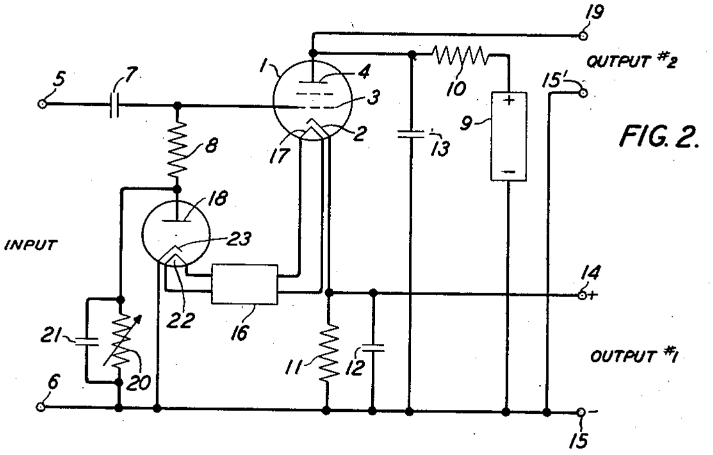
Figure 3:
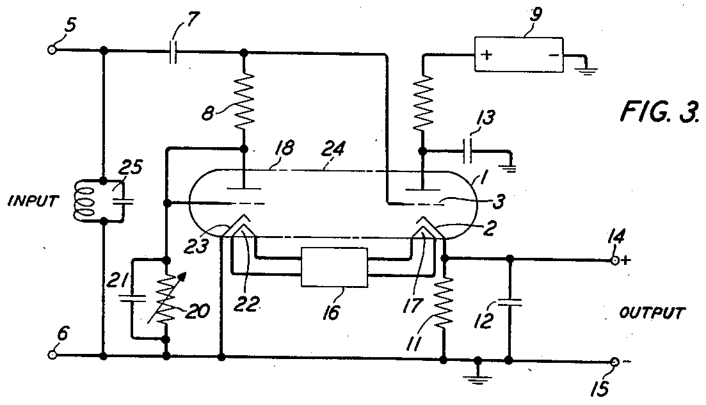
Figure 4:
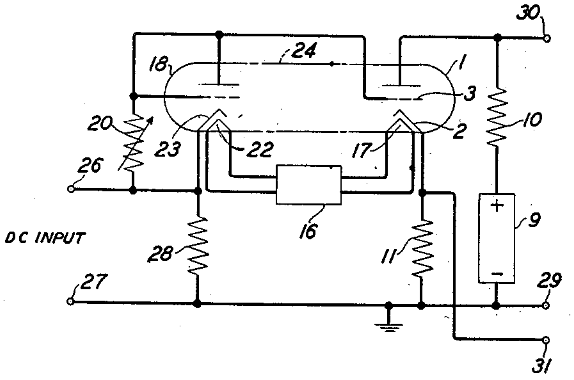
Figure 5:
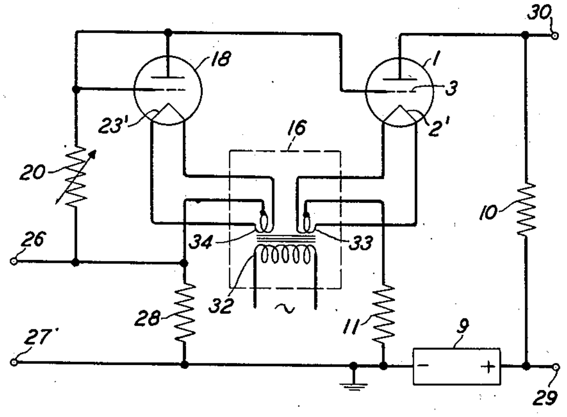

The invention may be better understood by referring to the accompanying drawings in which:

Fig. 1 illustrates one type of grid controlled rectifier circuit of the prior art operating in accordance with the principle of plate rectification;

Fig. 2 discloses an embodiment of this invention as applied to a circuit of the type shown in Fig. 1 to compensate the variations in space current with variations in cathode temperature;

Fig. 3 discloses a slightly different arrangement of the circuit disclosed in Fig. 2;

Fig. 4 discloses an embodiment of the invention applied to a direct current amplifier; and Fig. 5 shows the invention applied to a direct current amplifier using directly heated cathodes.

Referring now more particularly to Fig. 1 disclosing a well-known prior art type of plate rectifier. In this circuit a vacuum tube 1 having a cathode 2, at least one grid 3 and an anode 4, is connected to an input circuit 5, 6 through a condenser 7 and grid resistor 8. Plate current is supplied from a direct current source 9 through a resistor 10 through the vacuum tube 1 and a self-bias resistor 11, the latter being by-passed for alternating current variations by means of a condenser 12. The self-bias resistor, as is well known, provides direct current static bias for the grid 3. An additional condenser 13 may be connected from the anode to the lower end of resistor 11 to improve the rectifier efficiency. The output may be taken from either the anode or the cathode and in Fig. 1 the output circuit is specifically shown as being connected to the cathode. As is well known, if the circuit constants are properly selected the output direct current voltage appearing across terminals 14 and 15 will vary substantially as the square of the input alternating current applied to terminals 5 and 6. It has been discovered, however, that the space current variations through the tube fluctuate with variations of temperature in the cathode due to variations in the heater supply voltage 16. As this voltage varies the temperature of the heater 17 varies and consequently the temperature of the cathode 2 will vary, thus causing the cathode to emit more or less electrons depending upon whether the temperature has increased or decreased. This change in space current appears as a change in the rectified output voltage across terminals 14 and 15 and is, therefore, undesirable.

In order to overcome the undesirable variation in output voltage, as described above for Fig. 1, the circuit arrangement shown in Fig. 2 embodying this invention may be employed. In this figure the various circuit components corresponding with those in Fig. 1 carry the same reference numerals. It will be noted that this circuit is essentially identical with Fig. 1 except for the addition of a diode 18 and its associated circuit as well as the addition of a second output terminal 19 connected to the plate. This latter terminal has no special significance to the invention except to indicate that the output as far as this type of rectifier is concerned may be taken from either the anode or the cathode as previously described in connection with Fig. 1.

The addition of the diode 18 introduces into the circuit an application of a well-known phenomenon of electronic emission from heated cathodes. It is well known that as an electron emitting material is heated, electrons are emitted therefrom at a rate increasing with the temperature. It is also well known that as some of the electrons are emitted in the direction of the anode they will cause a current to flow in an external circuit such as, for example, that provided by resistor 20 even though no external source of electromotive force is used. This emission of electrons from the cathode of the diode toward its anode has been variously referred to as the "initial velocity potential" or "contact potential" as it has been conceived of as a source of electromotive force within the diode.

The cathode of diode 18 is heated by a heater 22 also connected to the same source 16 which supplies energy to the heater 17 for cathode 2 in tube 1. Consequently, the cathodes tend to change in temperature simultaneously and in substantially the same manner. The diode cathode 23 and the rectifier cathode 2 should respond in temperature in the same manner and at substantially the same rate to variations in temperatures of their heaters.

The initial velocity potential of the diode 18 produces a voltage drop across variable resistor 20 with polarity as indicated in the figure. This potential drop is adjustable by adjusting resistor 20. It will be noted that this potential drop is in series with the grid resistor 8, the grid 3, the cathode 2 and the bias resistor 11 and consequently acts to vary the bias on grid 3. When resistor 20 is properly adjusted and the other conditions as noted above are met, any tendency for the space current in tube 1 to increase due to an increase in temperature of its cathode 2 will be offset by an increase of the bias across resistor 20 by reason of a corresponding increase in the initial velocity potential of diode 18. This makes the grid 3 more negative and thereby prevents the increase in space current which would otherwise take place in tube 1. When the cathode temperature of tube 1 lowers, the temperature of cathode 23 also lowers correspondingly, ultimately resulting in a decrease in the bias on the grid of tube 1 to thereby prevent a decrease in the space current thereof.

The squared, rectified output from the rectifier tube 1 may be obtained from the direct current component appearing across either the cathode resistor 11 and its by-pass condenser 12 or anode resistor 10 and its by-pass condenser 13. In the former case the output is referred to as output No. 1 and is obtained from terminals 14 and 15 whereas in the second case the output is obtained from terminals 19 and 15' and is referred to on the drawings as output No. 2.

In accordance with this invention, it is necessary that the cathodes of the rectifier tube 1 and the diode 18 vary in substantially the same manner and if complete stability is to be maintained during the time the cathodes are changing in temperature, the rate of change of temperature of the two should be substantially equal. One manner in achieving this objective is to select two separate tubes whose cathode heating and emission characteristics are substantially identical. Another method is to select a single tube having two space current paths as, for example, tube 24 shown in Fig. 3. In this figure the tube 24 is shown as a twin triode with the left-hand triode section 18 connected as a diode, that is, with its grid connected to its plate external to the tube. Selecting a tube in this manner takes advantage of the tendency to manufacture both sides of the twin triode with substantially identical cathodes and heaters. In actual practice it has been found that these cathodes vary somewhat in any particular tube but with a little care in selecting the tube a pair of cathodes may be found which are closely enough matched in their thermal characteristics to give very good stability.

The circuit of Fig. 3, it will be observed, is substantially identical with the circuit previously described for Fig. 2. A tuned input circuit including a tuned network 25 is shown in Fig. 3. While this network was not shown in Figs. 1 or 2, it is obvious that such a network may be used and is commonly used in these circuits.

The circuits thus far described are specific to grid-controlled rectifiers employing the principle of plate rectification. Figs. 4 and 5 illustrate the invention as applied to direct current amplifiers.

Referring now to Fig. 4 a twin triode 24 of the same type illustrated in Fig. 3 is disclosed. The cathode heating circuit is identical with that previously described for Fig. 3 and the various circuit elements thereof performing the same functions bear the same reference numerals. Normal bias for the grid of tube section 1 is obtained by an unbypassed resistor 11 in the cathode circuit. The by-pass capacitor usually used in alternating current amplifiers is not necessary in the direct current amplifier except for special applications which need not be described here in order to illustrate this invention.

The input voltage to the direct current amplifier of Fig. 4 is applied to the input terminals 26 and 27 and if the direct current signal source does not contain a circuit continuous between these terminals, then a resistor 28 should be connected between the cathode 23 and terminal 27. It will be noted that this resistor 28 is in a direct current path between cathode 23 and cathode 2, which path also includes resistor 11. Thus the direct current path from grid 3 to its cathode 2 is traced through resistor 20, resistor 28 and resistor 11.

The operation of Fig. 4, in so far as the embodiment of this invention therein is concerned, is substantially identical with that already described for the plate rectifier circuit of Figs. 2 and 3. Normal bias is provided by the voltage drop in resistor 11. The input voltage is supplied by the drop across resistor 28 which is connected in series with resistor 11. The compensating potential developed across resistor 20 is in series with both the bias and the input potentials to compensate for variations in space current in the tube section 1 for variations in the temperature of the cathode 2. The amplified direct current is obtained from terminals 29 and 30. A direct current output may also be obtained across resistor 11 between terminals 29 and 31.

Fig. 5 discloses another direct current amplifier employing directly heated cathodes instead of the indirectly heated cathodes disclosed in the prior figures. In this figure the cathode heating source 16 comprises a transformer with primary winding 32 and secondaries 33 and 34. The secondaries are center tapped and insulated from each other. The secondary 33 is connected to the cathode 2' of tube 1 while secondary 34 is connected to the cathode 23' of tube 18. It is obvious that if the input voltage to the primary 32 changes, the temperatures of the two cathodes will correspondingly and simultaneously vary.

The operation of the circuit disclosed in Fig. 5 is believed obvious from the previous description of the circuit disclosed in Fig. 4.

From the foregoing description of the several circuits it will be obvious that the principle involved in this invention is that the space current variations in a space current path may be compensated automatically for variations in the cathode temperature by connecting in series with the grid circuit a second space current path, the cathode temperature of which varies in substantially the same manner as the cathode in the first path, so that the initial velocity potential developed in the second space current path may be utilized to automatically vary the direct current bias on the grid of the first space current path. While the invention has been described in connection with certain specific embodiments of the invention, it is obvious that it may be applied to a considerable variety of circuits of configuration different from those specifically disclosed herein and also may be embodied in circuits involving tubes with different numbers and arrangements of electrodes from those specifically employed to illustrate the invention.

What is claimed is:

1. A vacuum tube circuit comprising a first space current path including at least an anode, a grid and a directly heated cathode, said space current being variable as a function of the temperature of the cathode, a second space current path including an anode and a directly heated cathode, a resistance means connected directly across the anode and cathode of the second space current path, a transformer winding connected to the first-named directly heated cathode, a separate transformer winding connected to the second cathode, circuits coupling said two windings to the same source of electric energy whereby the cathode temperature of both paths varies in substantially the same manner, conductive means connecting the second anode to the grid, and another conductive means connecting the cathode of the second path to the cathode of the first path, whereby the initial velocity potential of said second path may vary the grid bias to automatically stabilize the plate current in the first path for variations of cathode temperature.

2. A vacuum tube circuit comprising a first space current path including at least an anode, a grid and a directly heated cathode, said space current being variable as a function of the temperature of the cathode, a second space current path including an anode and a directly heated cathode, a resistance means connected directly across the anode and cathode of the second space current path, a transformer winding connected to the first-named directly heated cathode, a separate transformer winding connected to the second cathode, circuits coupling said two windings to the same source of electric energy whereby the cathode temperature of both paths varies in substantially the same manner, a resistor connecting the second anode to the grid, and a conductive means interconnecting the cathodes, whereby the initial velocity potential of said second path may vary the grid bias to automatically stabilize the plate current in the first path for variations of cathode temperature.

CLARENCE H. YOUNG.

REFERENCES CITED

The following references are of record in the file of this patent:

UNITED STATES PATENTS

| Number | Name | Date |
|---|---|---|
| 1,878,046 | Weiller | Sept. 20, 1932 |
| 2,137,846 | Klutke | Nov. 22, 1938 |
| 2,230,926 | Bingley | Feb. 4, 1941 |
| 2,316,044 | Blair | Apr. 6, 1943 |
| 2,392,416 | Sorensen | Jan. 8, 1946 |
| 2,408,261 | Lakatos | Sept. 24, 1946 |
| 2,479,970 | Schmitt | Aug. 23, 1949 |

OTHER REFERENCES

"The Matter of Contact Potential" by R. M. Bowie, Proceedings of the Institute of Radio Engineers, vol. 24, Number 11, November 1936, page 1054.